United States Patent Office 3,037,438
Patented June 5, 1962

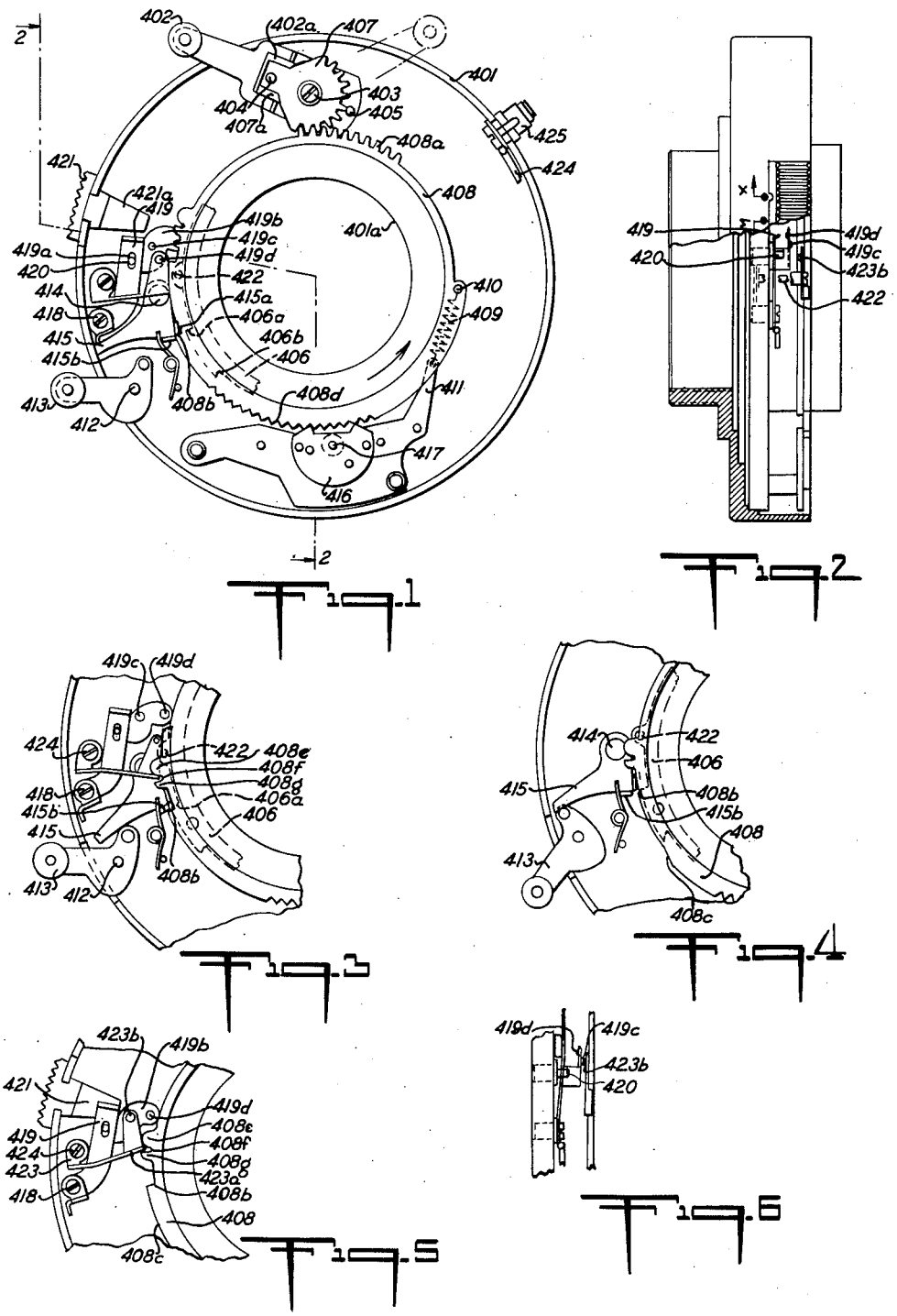

3,037,438
CENTERING SHUTTER FOR PHOTOGRAPHIC CAMERAS
Helmut Junghans, Eckenhof, Schramberg-Sulgen, Wurttemberg, Germany; Kurt von Zeppelin, Goethestrasse 30, and Rudolf Weber, Untere Schillerstrasse 24, both of Schramberg, Wurttemberg, Germany
Original application Mar. 29, 1952, Ser. No. 279,396, now Patent No. 2,891,456, dated June 23, 1959. Divided and this application July 24, 1958, Ser. No. 750,808
14 Claims. (Cl. 95—11.5)

This invention relates to photographic devices and in particular to control of mechanisms associated with the shutters of cameras.

This application is a divisional application based on our co-pending application, Serial Number 279,396, filed March 29, 1952, the co-pending application now being Patent Number 2,891,456 which issued on June 23, 1959.

It is an object of the invention to provide an improved shutter control mechanism. More particularly it is an object of the invention to provide improvements with respect to the structure disclosed and claimed in the aforesaid patent.

It is a further object of the invention to incorporate into a shutter control mechanism a synchronizing device which enables shutter operations and associated functions to be effected with an optimum accuracy.

Still another object of the invention relates to the provision of improved means for initiating the operation of a flash bulb ignition system.

More specifically, the objects of the invention include the provision of a flash bulb ignition control cooperatively associated with a shutter control mechanism in such a manner as to permit the selective control of the relative time at which a flash bulb is made to ignite.

Briefly, to achieve the objectives of the invention and in accordance with one embodiment thereof, it is contemplated, for example, that a shutter drive device be provided with which is operatively associated a synchronization device, there being further provided a source of power such as one or more springs which are coupled to the shutter drive and synchronization devices to provide power for operating the same. A release is provided which engages the synchronization device as well as the shutter drive device to prevent operation of the same. This release is disengageable to permit actuation of the synchronization device and the release itself is responsive to the actuated synchronization device to enable operation of the shutter drive device.

A flash bulb ignition system is provided, for example, which is selectively associated with one of a number of controls which are in turn associated with either the shutter drive device or the synchronization device. Thus, by proper selection, a flash bulb ignition system can be controlled by the synchronization device which is actuated prior to the actuation of the shutter drive device whereby the flash bulb ignition system is actuated at a relative time which is early in the sequence of shutter control operations; alternatively, the flash bulb ignition system can be controlled by means of a control on the shutter drive device so that the ignition of a flash bulb is effective subsequent to the time at which it would be effected if the synchronization device were to be the controlling mechanism.

It is to be noted in accordance with preferred embodiments of the invention, that a release mechanism is provided for the shutter drive device which must necessarily act through the intermediary of the synchronization device.

In other words, the release mechanism cannot, with the preferred embodiment of the invention, operate directly and independently to complete the actuation of the associated shutter.

Moreover, as a feature of the invention, there is provided a device for tensioning springs which provide power for the shutter drive and synchronization devices which tensioning device assumes a cocked position when power is available for the shutter drive and synchronization devices and does not leave this position until the shutter drive device has been actuated. Consequently, the tensioning device serves as an indicator of readiness for operation as well as constituting a means for providing a source of power.

In accordance with another feature of the invention, there is incorporated into the system an escapement mechanism which controls the operation of the synchronization device after the same has been actuated. The escapement mechanism serves to render the operation of the synchronization device perfectly uniform so that, with mechanisms provided by the invention, the period can always be judged with extreme accuracy and the repeating of particular operations is always possible.

Still another feature of the invention relates to the particular details of a selector mechanism which enables the selection of flash bulb ignition operations which, for the purpose of this application, will be characterized, for example, as instantaneous and pre-ignition flash bulb operations.

Advantageously, the invention provides its benefits in a small, compact unit, the controls for which are readily available and easily engaged for purposes of shutter control.

Other objects, features and advantages of the invention will be apparent from the following detailed description of a preferred embodiment as illustrated in the accompanying drawing in which:

FIGURE 1 is a plan view, partially in section, of a shutter control mechanism embodying a synchronization device and flash bulb ignition system in accordance with the provisions of the invention;

FIGURE 2 is a sectional side view of the structure of FIGURE 1, taken along line 2—2 in FIGURE 1;

FIGURE 3 illustrates a portion of FIGURE 1 with the synchronization device in readiness to be actuated;

FIGURE 4 illustrates the synchronization device in release position with the shutter drive device locked against operation;

FIGURE 5 illustrates the actuation of the flash bulb ignition system by one of the controls noted above; and FIGURE 6 is a side view of FIGURE 5.

For the details of a shutter mechanism itself, reference is made to the above-noted patent inasmuch as the shutter mechanism itself is not shown in the drawing for purposes of clarity. Moreover, the particular source of power used to drive the shutter drive device can also be found in the aforementioned patent and is likewise not shown in the drawing in order to provide for a clearer understanding of the details of the structure which is to be explained below.

In FIGURES 1–6, and with particular reference to FIGURE 1, the structure of the invention includes a housing 401, which supports all of the controls and devices which have been noted above. The housing 401 defines a central opening 401a, through which a photographic image is transmitted and in which aperture a shutter mechanism (not shown) operates to close and open the same.

The structure further includes a tensioning lever 402, pivotally journalled on a pin 403, which is mounted on the housing 401. Pins 404 and 405 are supported on the lever 402 for the pivotal connection of rods or levers (not shown) which operate through springs (not shown) which are placed under tension by movement of lever 402 and which in tensioned condition serve as sources of power for actuating the shutter drive device 406, the function of which is completely explained in the aforementioned co-pending application.

Also rotatably mounted on the pin 403 is freely rotatable gear 407 having a toothed periphery and including a projection 407a. The lever 402 comprises a forked structure, the inside opening 402a having a dimension which exceeds that of projection 407a on gear 407. The forked structure therefore loosely accommodates the projection 407a or, in other words, there is a certain amount of play existing between these elements. This constitutes a feature of the invention whereby, although the gear 407 can be rotated by means of the lever 402 so that these elements are displaceable to the tensioning position illustrated by the dash-dot lines, any force acting on the gear 407 and tending to rotate the same through a small angle will not be transmitted to the lever 402, which as a consequence thereof retains a stationary tensioning position. Moreover, forces acting on the lever 402, through the intermediary of pins 404 and 405, are not transmitted to the gear 407 which, as a consequence, is virtually independent of said forces.

The teeth of gear 407 are engaged with teeth 408a on the synchronization device or ring 408, which is coaxially and peripherally arranged relative to the circular aperture 401a. Actuating power for the synchronization device 408 is provided by a spring 409, which may be any conventional form of spring such as a helix. One end of the spring 409 is engaged with the synchronization device 408 by means of a lug 410 integral with the synchronization device 408. The other end of spring 409 is secured to a bridge 411 fixed on the housing 401.

From the structure described above, it follows that the synchronization device 408 has to be rotated in counter-clockwise direction relative to the position shown in FIGURE 1 in order for this member to be placed under tension and in readiness for operation. In other words, the counter-clockwise rotation of synchronization device 408 places the spring 409 under tension and unless the synchronization device is restricted against rotation, when spring 409 is under tension, the synchronization device 408 will tend to return to its original position as shown in FIGURE 1. It is to be noted, of course, that a movement of lever 402 from the position shown by the use of solid lines in FIGURE 1 to the position shown in dash-dot lines operates to place spring 409 under tension and thus cock the synchronization device 408 and render the same ready for operation.

Actually, the operation of synchronization device 408 consists of two sequential operations, to wit: the tensioning operation described above and a releasing operation next indicated in detail.

When the synchronization device 408 has been cocked, it is held in cocked position by means of abutments as will be described. To release the synchronization device, there is provided a release lever 413 pivotally mounted on a pin 412 supported on housing 401. The lever 413 is cooperatively associated with a locking lever 415 which is rotatably supported on a pin 414 affixed to the housing 401. The lever 413 functions through the intermediary of locking lever 415 to control the synchronization device 408 and, through the intermediary thereof, the operation of shutter drive device 406.

The lever 415 includes a lug 415a engageable with lugs 406a and 406b on shutter drive device 406. Since the shutter mechanism, as described in our co-pending application, reverses its direction of movement between exposures, the shutter driving member 406 effects driving movements alternately in opposite rotational directions. For that reason, 406a and 406b are provided against which lever 415 abuts for each operation of the mechanism.

The lever 415 has a second lug 415b with which the lever cooperates with synchronization device 408. In tensioned condition (see FIG. 3), shoulder 408b on the synchronization device 408 abuts against lug 415b. This locks the synchronization device 408 in tensioned or cocked condition for subsequent release and actuation.

As will be explained in greater detail hereinafter, the shutter drive device 406 cannot be actuated directly by operation of members 413 and 415, and this is instead effected indirectly by means of the synchronization device 408 which, for purposes of this function, is provided with a lifting cam 408c (FIG. 4) which engages lever 415 when the synchronization device 408 has performed a flash bulb ignition function as will subsequently be described.

In order to retard the escape or actuation of the synchronization device 408, this member is controlled during actuation by an escapement mechanism 416 pivotally journalled on a pin 417 mounted on the bridge 411 and on the housing 401. The escapement mechanism 416 cooperates with teeth 408d on the synchronization device 408 in a manner conventional per se so that the movement of the synchronization device 408, in a rotational sense, is both retarded and uniform.

To facilitate an understanding of the operation of the structure, it is now simply indicated that the synchronization device 408 operates prior to the release or actuation of the shutter drive device 406. In order that the operation of the device provided in accordance with the invention can be described as a whole, the flash bulb ignition system provided in accordance with the invention is next indicated.

It has been noted above that the invention provides for the selective time control of the flash bulb ignition system. For this selection, a spring or blade 419 is provided and is affixed in electrically insulated manner to the housing 401 by means of a screw or bolt 418. The spring 419, for purposes of this selecting function, is intended to be moved toward or away from the plane of the drawing as indicated in FIG. 1 and, to prevent a rotational movement of the spring, the same is provided with a slot 419a which is engaged by a stud 420 mounted on and electrically insulated from the housing 401.

The spring 419 does not lay flat against the housing 401, but is elevated therefrom to define a space with the housing 401 to accommodate a blade-like extension 421a on a control 421 (see FIGS. 5 and 6) for purposes of displacement of the blade or spring 419. The control 421, which it will be noted extends externally of the housing 401, can be disposed between two positions; one of these positions is indicated in FIG. 1 and causes the blade 421a to be disengaged from spring 419, and the other position is indicated in FIGS. 5 and 6 by means of which blade 421a engages spring 419 and causes the same to be lifted away from housing 401. It will be noted in the description that follows that the position of spring 419 is determinative of the relative time at which flash bulb ignition occurs.

The spring 419 includes an extension 419b connected by an angle to the main body of spring 419. Extension 419b is thus positioned in a plane spaced parallel to the main section of spring 419. This is best seen in FIG. 6. Extension 419b supports two contacts 419c and 419d on opposite sides of the said extension. Contact 419c is effective for one type of flash bulb ignition operation whereas contact 419d is utilized for another flash bulb ignition operation. These two contacts, however, have common connection with an associated flash bulb ignition circuit and the spring 419 can be analogized somewhat to a single pole, double throw switch. There are, however, no fixed contacts for contacts 419c and d to engage as will become hereinafter apparent.

For instantaneous ignition of the flash bulb, use is made of contact 419d, the engagement of which is controlled by shutter drive device 406. Spring 419 is made ready for this operation by placing the control 421 in such a position that blade 421a is out of engagement with spring 419. The positions of the various elements relatively to housing 401 is, under these conditions, indicated in FIG. 2. For this type of operation, a movement of synchronization device 408, while controlling the operation of shutter drive device 406, is not employed for flash bulb ignition purposes.

To employ the synchronization device 408, for flash bulb ignition purposes, control 421 is placed in the position indicated in FIG. 5 where blade 421 engages spring 419 and elevates the same with respect to housing 401. The position of the various elements relative to housing 401 is, for this condition, best seen in FIG. 6. In this position, contact 419 is outside the range of contact 422 mounted on shutter drive device 406, and contact 419c is within the range of spring mounted contact 423b mounted on spring 423 supported on housing 401 by screw 424. Spring 423 is in the nature of a cantilever spring and in the form of a blade the plane of which is perpendicular to the face of housing 401 as best shown in FIG. 3. At the end of spring 423 opposite to that end coupled by screw 424 to housing 401, the cantilever spring supports contact 423b for displacement by the synchronization device 408 and for wiping across the contact 419c to close the ignition circuit.

Spring 423 cooperates by means of its edge 423a (see FIG. 5) with a cam 408e adjacent recess 408f and a lifting cam 408g, all of which are included or defined by synchronization device 408. This structure is arranged in such a manner that when the synchronization device 408 is cocked, cam 408e bends back spring 423 (see FIG. 3 for the manner in which device 408 is rotated counter clockwise). Spring edge 423a, under these circumstances, rests or is accommodated in recess 408f.

After actuation of synchronization device 408, cam 408g carries spring 423 in a counter-clockwise direction relative to screw 424, (see FIG. 5), thus bringing contact 423b into engagement or contact with contact 419c on extension 419b of spring 419 (see FIGS. 5 and 6). A further movement of synchronizaiton device 408 interrupts contact between these two latter mentioned contacts with the spring 423 dropping from the cam 408g.

The spring 419 is, as previously mentioned, coupled by screw 418 to housing 401. The spring is supplied with current by a lead 424 connected with a terminal 425 mounted on the housing 401 and electrically insulated therefrom. Projection 421a is, of course, of insulating material so as not to short-circuit spring 419, and contacts 423b and 422 are coupled to the housing 401 which thus constitutes a ground for completing a flash bulb ignition circuit.

The device has two types of operation as next explained:

For an instantaneous ignition, the control 421 is moved into the position shown in FIGS. 1 and 2. Lever 402 is moved into tensioning position so that shutter drive device 406 and synchronization device 408 are brought into cocked position (see FIG. 3). The spring 409 is thus tensioned and shutter drive member rests with shoulder 406a against lug 415a, the synchronization device 408 resting with shoulder 408b against lug 415b. With release lever 413 brought into release position (see FIG. 4), lug 415b releases synchronization device 408. Lugs 415a and 415b are so relatively positioned that only the synchronization device 408 is released at this time, whereas shutter drive device 406 is maintained in cocked position by lug 415a.

As a result of the release of synchronization device 408, the same is actuated by spring 409 and the potential energy of spring 409 is converted into kinetic energy until spring 409 assumes its normal position of rest.

The movement of synchronization device 408 is retarded and rendered uniform by escapement mechanism 416.

Cam 408g bends spring 423 from the position shown in FIG. 3 to the position shown in FIG. 5. However, no contact between contacts 423b and 419c is effected inasmuch as spring 419, is in a position closest to housing 401 as shown in FIGS. 1 and 2. Thus, an ignition of the flash bulb is not effected by movement of synchronization device 408.

When synchronization device 408 approaches the end of its rotation, its lifting cam 408c moves lever 415 into a "full release position" whereby lug 415a releases shutter drive device 406 for rotation. During rotation of shutter drive device 406 which is in clockwise direction, contact 422 mounted on shutter drive device 406 slides over contact 419d which has been appropriately positioned and closes the ignition circuit to ignite an associated flash bulb.

In the operation described above, the releasing of the synchronization device has subsequently effected a release of the shutter drive device and a contact on the shutter drive device has been employed to effect flash bulb ignition. In order to enable the use of a flash bulb having an ignition time of, for example, twenty milliseconds, the control 421 is moved into the position illustrated in FIGS. 5 and 6. Consequently, the blade 421a elevates spring 419 bringing contact 419c to the level of contact 423b when the latter is in raised position due to displacement of spring 423. The contact between contacts 419c and 423b is controlled by the synchronization device 408. Movement of synchronization 408 causes a displacement of spring 423, as described above, with a resulting engagement between contacts 423b and 419c to close the ignition circuit before the actuation of shutter drive device 406 so that the flash bulb has a period within which to reach its maximum light intensity before the associated shutter is actuated.

In the above description, it is seen that a special control mechanism has been provided wherein a release mechanism operates through the medium of a synchronization device to effect release of a shutter drive device. The shutter drive device is not directly operated by the release but is instead controlled by the synchronization device which operates on the release after having been itself actuated by the release.

Further, there has been provided a flash bulb ignition device controlled by elements electrically associated with controls coupled to the sequentially operating synchronization and shutter drive devices.

A source of power has been indicated in the form of a spring for operation of the synchronization device and a lever is employed for bringing the synchronization device to a cocked position, the lever simultaneously serving to indicate that the shutter control mechanism is in readiness for operation.

There has further been employed an escapement mechanism to control the movement of the synchronization device when actuated and, in general, it is to be noted that the shutter drive and synchronization devices comprise concentric, rotatable rings, the release comprising lugs for sequentially disengaging the rings to permit an actuation thereof.

An ignition system is provided for flash bulbs in the structure of the invention whereby a contemporaneous or premature ignition is enabled relative to the operation of an associated shutter.

There will be obvious to those skilled in the art, many modifications and variations of the structures set forth. These modifications and variations will not, however, depart from the spirit of the invention defined in the following claims.

What is claimed is:

1. A shutter control mechanism comprising shutter drive means, synchronization means operatively associated with and controlling the shutter drive means, said shutter drive means and synchronization means comprising concentric rotatable rings, means coupled to the rings for operating the same, a release for engaging said rings and preventing rotation thereof, said release being disengageable from the ring of the synchronization means to permit rotation thereof, said release being responsive to the rotation of said ring of the synchronization means to be disengaged from the ring of the shutter drive means to permit rotation thereof, flashbulb ignition means and means for actuating the same, and control means selectively engageable with at least one of the rings of the shutter drive means and the synchronization means and coupled to the means for actuating the ignition means for selective actuation of the ignition means.

2. A mechanism as claimed in claim 1 wherein said means for operating the rings comprises a spring coupled to the ring of the synchronization means and a lever engaging the ring of the synchronization means to displace the same against the action of the spring.

3. A mechanism as claimed in claim 1 wherein the ring of the synchronization means comprises teeth on the periphery thereof, said mechanism further comprising an escapement mechanism engaging the teeth on said ring for controlling the actuated ring of the synchronization means.

4. A mechanism as claimed in claim 1 wherein the ring of the synchronization means comprises teeth on the periphery thereof and said means for operating the rings comprises a spring coupled to the ring of the synchronization means for opposing its rotation in one direction while storing energy to rotate the ring in the opposite direction, a gear engaging the teeth on the ring, and a lever engaging the gear for rotating the latter ring in said one direction.

5. A mechanism as claimed in claim 1 wherein said release comprises lugs for engaging the rings and preventing rotation thereof, a lever coupled to and supporting the lugs, and a pivot supporting the lever; the ring of the synchronization means including a cam which on rotation of the latter said ring engages said lever; the pivoting of said lever initially releasing the ring of the synchronization means whereupon the engagement of the cam with the lever further displaces the lever to release the ring of the shutter drive means.

6. A shutter control mechanism comprising ignition means for igniting a flashbulb, spring-loaded first and second concentric rings one of which is adapted for a shutter actuation operation and the other of which is adapted for controlling the actuation of said one ring, means for controlling the rotation of said other ring to initiate the subsequent action of said one ring, ignition actuating controls independently coupled to each of said rings, and selector means for selectively coupling the controls to the flashbulb ignition means to control the relative time of ignition.

7. A mechanism as claimed in claim 6 wherein the selector means comprises a cantilever spring, contacts on said spring, and means for displacing the spring; said controls comprising contacts for the engagement of the first said contacts in accordance with the displacement of the spring.

8. A mechanism as claimed in claim 6 wherein at least one of said controls comprises a cam on one of said rings and a blade-supported contact displaceable by this ring during rotation thereof; said ignition actuating controls comprising a contact for engaging the blade-supported contact; said ignition means comprising an electrical circuit coupled to said contacts.

9. A shutter control comprising a housing for the shutter and defining a circular aperture for photographic purposes, first and second rings concentric with the aperture and rotatably supported on the housing, said first ring being spring loaded and adapted to operate the shutter, a toothed portion on the second ring, a spring connected between the housing and the second ring to resist rotation of the latter, a gear on the housing and engaging the toothed portion, a lever engaging the gear to rotate the second ring against the force of the spring, shoulders on the first and second rings, a lever pivoted on the housing, lugs on the pivoted lever for engaging the shoulders and holding the rings in cocked condition, said second ring being releasable before the first ring by the lugs, a cam on the second ring for the engagement of the pivoted lever on rotation of the second ring, means on the housing for displacing the pivoted lever to release the second ring, said cam further displacing the pivoted lever to release the first ring for the actuation of the shutter, a flashbulb ignition circuit, engageable contacts in the circuit for opening and closing the same, a blade on the housing and insulated therefrom for supporting two of the contacts in spaced relation but with common connection in the circuit, a control member for displacing the blade and said two contacts between two positions spaced axially relative to the rings, a further blade supporting a further one of the contacts for displacement to one of the positions, and a cam on one of said rings for the displacement of said further blade on rotation of said second ring, one of said rings supporting another of the contacts for movement to the other of said positions.

10. A control as claimed in claim 9, wherein said second ring includes a further toothed portion, and comprising an escapement mechanism on the housing engaging the further toothed portion.

11. A control as claimed in claim 9 wherein the first said lever includes a fork-shaped structure, said gear including a projection loosely engaged by said structure.

12. A control as claimed in claim 9 wherein said displacing means comprises a release lever pivoted on the housing and extending externally thereof, said release lever detachably engaging the pivot lever.

13. A control as claimed in claim 9 comprising an extension on the control member extending externally of said housing.

14. A control as claimed in claim 9 comprising a spring engaging the pivoted lever to urge the same into a shoulder-engaging position.

References Cited in the file of this patent
UNITED STATES PATENTS

| | | |
|---|---|---|
| 2,245,248 | Aulenbacher | June 10, 1941 |
| 2,319,086 | Riddell | May 11, 1943 |
| 2,468,702 | Fuerst | Apr. 26, 1949 |
| 2,514,919 | Willcox | July 11, 1950 |
| 2,627,215 | Pirwitz | Feb. 3, 1953 |
| 2,641,978 | Lawson | June 16, 1953 |
| 2,681,601 | Blodgett | June 22, 1954 |
| 2,772,614 | Rentschler | Dec. 4, 1956 |